United States Patent
Singhal et al.

(10) Patent No.: US 10,902,444 B2
(45) Date of Patent: Jan. 26, 2021

(54) COMPUTER APPLICATION MARKET CLUSTERS FOR APPLICATION SEARCHING

(71) Applicant: Microsoft Technology Licensing, LLC, Redmond, WA (US)

(72) Inventors: Aman Singhal, Bellevue, WA (US); Marcelo M. De Barros, Redmond, WA (US); Siddharth S. Shenoy, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1052 days.

(21) Appl. No.: 15/405,005

(22) Filed: Jan. 12, 2017

(65) Prior Publication Data
US 2018/0197191 A1  Jul. 12, 2018

(51) Int. Cl.
*G06Q 30/02* (2012.01)

(52) U.S. Cl.
CPC ................ *G06Q 30/0205* (2013.01)

(58) Field of Classification Search
CPC .................................... G06Q 30/0205
See application file for complete search history.

(56) References Cited

U.S. PATENT DOCUMENTS

| | | | |
|---|---|---|---|
| 5,970,489 A | 10/1999 | Jacobson et al. | |
| 6,523,021 B1 | 2/2003 | Monberg et al. | |
| 7,469,246 B1 | 12/2008 | Lamping | |
| 7,881,864 B2 | 2/2011 | Smith | |
| 8,078,197 B2 | 12/2011 | Gutierrez et al. | |
| 8,713,684 B2 * | 4/2014 | Bettini | G06F 21/57 726/25 |
| 8,997,081 B1 | 3/2015 | Manion et al. | |
| 9,332,381 B2 | 5/2016 | Yarvis | |
| 2005/0080786 A1 | 4/2005 | Fish et al. | |
| 2006/0242147 A1 | 10/2006 | Gehrking et al. | |

(Continued)

OTHER PUBLICATIONS

Elizabeth Williams et al, Mobile Context Recommendations from Social Media through Geotopical Clustering, University of Alabama, SERG-2015-01, pp. 1-34 (Year: 2015).*

(Continued)

*Primary Examiner* — Andre D Boyce
(74) *Attorney, Agent, or Firm* — Medley, Behrens & Lewis, LLC

(57) ABSTRACT

A market out of multiple available geographic markets can be inferred for each application in a first subset of computer applications. The inferring can include inferring each market from text in one or more metadata fields in application metadata from an online computerized store for the applications. Computer-readable market clusters can be generated, with each of the market clusters indicating a corresponding one of the markets, and with the clusters indicating an inferred market cluster of the computer-readable market clusters for each of the applications in the first subset. In response to a received application query, generating search results can include favoring inclusion of the one or more applications that are assigned to the identified market cluster relative to one or more applications that are not assigned to the identified market cluster.

20 Claims, 3 Drawing Sheets

(56) References Cited

U.S. PATENT DOCUMENTS

| | | | | |
|---|---|---|---|---|
| 2010/0153432 | A1* | 6/2010 | Pfeifer | G06F 16/289 |
| | | | | 707/769 |
| 2010/0169300 | A1 | 7/2010 | Liu et al. | |
| 2013/0185288 | A1 | 7/2013 | Nishiyama et al. | |
| 2014/0006434 | A1* | 1/2014 | Chervirala | G06Q 30/02 |
| | | | | 707/758 |
| 2014/0019442 | A1 | 1/2014 | Mahaniok et al. | |
| 2015/0212893 | A1* | 7/2015 | Pawar | G06F 16/128 |
| | | | | 707/649 |
| 2015/0324255 | A1* | 11/2015 | Kochunni | G06F 11/1448 |
| | | | | 711/162 |
| 2015/0341484 | A1* | 11/2015 | Yablokov | H04M 1/72577 |
| | | | | 455/410 |
| 2016/0012220 | A1 | 1/2016 | Padidar et al. | |
| 2016/0142482 | A1* | 5/2016 | Mehta | H04L 67/1095 |
| | | | | 709/203 |
| 2017/0118576 | A1* | 4/2017 | Sharifi | G06F 16/248 |
| 2017/0213243 | A1* | 7/2017 | Dollard | G06Q 30/0249 |
| 2018/0165554 | A1* | 6/2018 | Zhang | G06K 9/6269 |

OTHER PUBLICATIONS

Ganesh Ananthanarayanan et al, StarTrack: A Framework for Enabling Track-Based Applications, MobiSys'09, Jun. 22-25, 2009, Kraków, Poland, pp. 207-219 (Year: 2009).*

Reyburn, Scott, "Google Discloses How Search for Google Play Works for the First Time; 12 Percent of Dau Search for Apps Daily", http://www.adweek.com/socialtimes/google-discloses-how-search-for-google-play-works-for-the-first-time-12-percent-of-dau-search-for-apps-daily/539639, Published on: May 17, 2013, 7 pages.

* cited by examiner

COMPUTER APPLICATION MARKET CLUSTERS FOR APPLICATION SEARCHING

BACKGROUND

Computer search engines can provide results for application category queries. Application category queries are computer queries that request results representing computer applications that are available from online computer application stores. An application category query may request applications for categories that are maintained by the online computer application stores, or they may request different categories that may include applications within several of the online store categories. For example, an application category query may state, "shopping apps," requesting computer applications dealing with shopping, which may align with a "shopping" category for computer applications in an online computer application store. As another example, an application category query may state, "car apps," requesting computer applications dealing with cars, even though the online application store for which application metadata is being retrieved in response to the query has no "cars" category. Accordingly, the search results may return entries for applications dealing with cars, which may include applications from a "shopping" category, a "navigation" category, and a "lifestyle" category in a corresponding online application store. Each entry for an application in the search results can be presented using a user interface device. Each such entry can include identifying data for the application (e.g., the application title), and possibly other metadata for the application (such as an average user review rating for the application).

SUMMARY

Search engine application category queries have not been limited by geographic markets, which are markets that include geographic components. Accordingly, a user in one geographic area often receives results from an application category query for applications that are only useable in other geographic areas. Tools and techniques discussed herein relate to inferring markets for applications available from online application stores, and using such inferred markets to tailor results provided for application queries, such as application category queries.

In one aspect, the tools and techniques can include accessing application metadata from an online computerized store for a set of computer applications available from the store. A market out of multiple available markets can be inferred for each application in a first subset of the applications. The inferring can include inferring each market from text in one or more metadata fields in the application metadata, with each of the markets being defined at least in party by a corresponding geographic area. Computer-readable market clusters can be generated, with each of the market clusters indicating a corresponding one of the markets, and with the clusters indicating an inferred market cluster of the computer-readable market clusters for each of the applications in the first subset.

A computer application query can be received, and in response to the query, a market cluster to which the query applies can be identified, with the market cluster to which the query applies being one of the computer-readable market clusters. Computer search results can be generated, with the generating of the computer search results comprising favoring inclusion of one or more listings for one or more applications assigned to the identified market cluster relative to one or more listings for one or more applications not assigned to the identified market cluster. This favoring can be done in response to the identifying of the market cluster to which the query applies.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
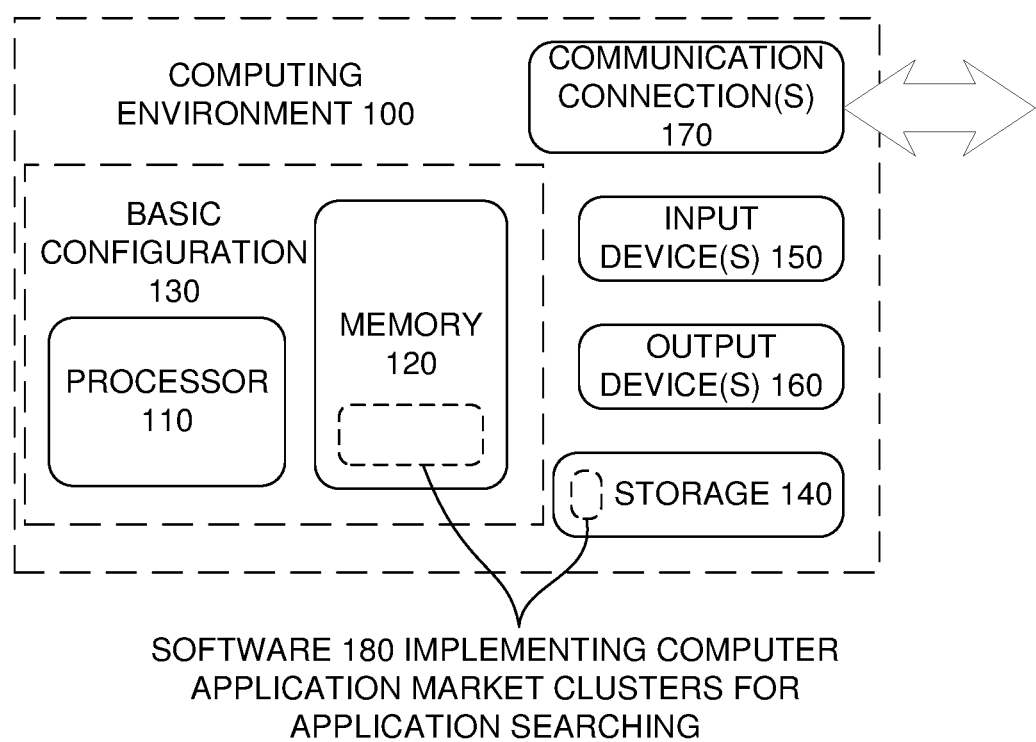
FIG. 1 is a block diagram of a suitable computing environment in which one or more of the described aspects may be implemented.

Aspects described herein are directed to techniques and tools for providing improved search results for application queries, such as application category queries. Such improvements may result from the use of various techniques and tools separately or in combination.

Such techniques and tools may include using one or more of various techniques to infer the market that an application is relevant for, even though the application might be available from an online application store in an application feed for all the markets by default. The techniques can include direct inference techniques, which rely on inferring a market via extracting and analyzing text from metadata retrieved from an online store where the application is available. Examples of such metadata can include an application title, an application description, and a publisher name. Such metadata fields can be known by different labels in different systems (such as seller name, rather than publisher name for the entity providing the application to an application store for distribution to client devices). These direct inference techniques can also be supplemented with other data, such as data about the publisher that is retrieved from outside the online application store. With the market for applications determined from such metadata, the applications can be grouped into market clusters, with each cluster having market data associated with it to indicate, and possibly define, the relevant market. Accordingly, a market cluster is computer-readable data that associates data for the applications assigned to the cluster with data indicating a market for the cluster.

The techniques can also include indirect inference techniques. For example, the indirect inference techniques can be used as secondary techniques for applications that have not been assigned to market clusters using the direct inference techniques. The indirect inference techniques can use clustering techniques to determine the proximity of a subject application to a cluster. If the subject application is sufficiently close (such as by a proximity score reading a threshold) to a cluster, then the computer system can assign the application to that cluster. Thus, the assigned application can indirectly get the market data from that corresponding assigned cluster.

The market cluster assignment data for the applications can be used in responding to application category queries. For example, responding to such a query can include identifying a market cluster that corresponds to the query (e.g., a market cluster for a geographic area in which the computer determines a device that submits the query to be located). Responding to the query can also include identifying one or more applications responsive to the query, with the identifying of the one or more responsive applications including determining that one or more responsive market-specific applications are assigned to the market cluster identified for the query. The search results may include listings for other applications, in addition to the applications assigned to the market cluster. For example, the search results may include listings for applications that are not assigned to any market cluster (e.g., because their usefulness is not limited to any geographic market).

In previous responses to application category queries, listings for applications that are only useable in other markets have been included and often ranked highly in returned search results. This leads to users selecting such application listings, retrieving additional data on such outside-the-market applications, and sometimes even downloading such outside-the-market applications before realizing that the applications do not apply in the pertinent market. For example, a user in the United States may download an application that arranges for food delivery in India and Japan, but cannot be used to arrange for food delivery in the United States. By using the market clusters to favor applications in the detected market cluster for an application category query, relative to other applications outside the market, the techniques discussed herein can increase computer system efficiency by reducing wasted computer resources and wasted user time associated with such outside-the-market applications. Accordingly, the techniques can improve the user search experience, and can improve the computer search system.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described aspects may be implemented. For example, one or more such computing environments can be used as a client device and/or as a computer device in one or more of the computerized services discussed below. Generally, various computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse types of computing environments.

With reference to FIG. 1, various illustrated hardware-based computer components will be discussed. As will be discussed, these hardware components may store and/or execute software. The computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing computer application market clusters for application searching. An implementation of computer application market clusters for application searching may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more aspects of the technology discussed herein. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The memory (120) can include storage (140) (though they are depicted separately in FIG. 1 for convenience), which may be removable or non-removable, and may include computer-readable storage media such as flash drives, magnetic disks, magnetic tapes or cassettes, CD-ROMs, CD-RWs, DVDs, which can be used to store information and which can be accessed within the computing environment (100). The storage (140) stores instructions for the software (180).

The input device(s) (150) may be one or more of various input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that can communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various aspects. Computer-executable instructions for program modules may be executed within a local or distributed computing environment. In a distributed computing environment, program modules may be located in both local and remote computer storage media.

For the sake of presentation, the detailed description uses terms like "determine," "favor," "generate," and "operate" to describe computer operations in a computing environment. These and other similar terms are high-level descriptions for operations performed by a computer, and should not be confused with acts performed by a human being, unless performance of an act by a human being (such as a "user") is explicitly noted. The actual computer operations corresponding to these terms vary depending on the implementation.

II. Computer Application Search System and Environment

Figure 2:
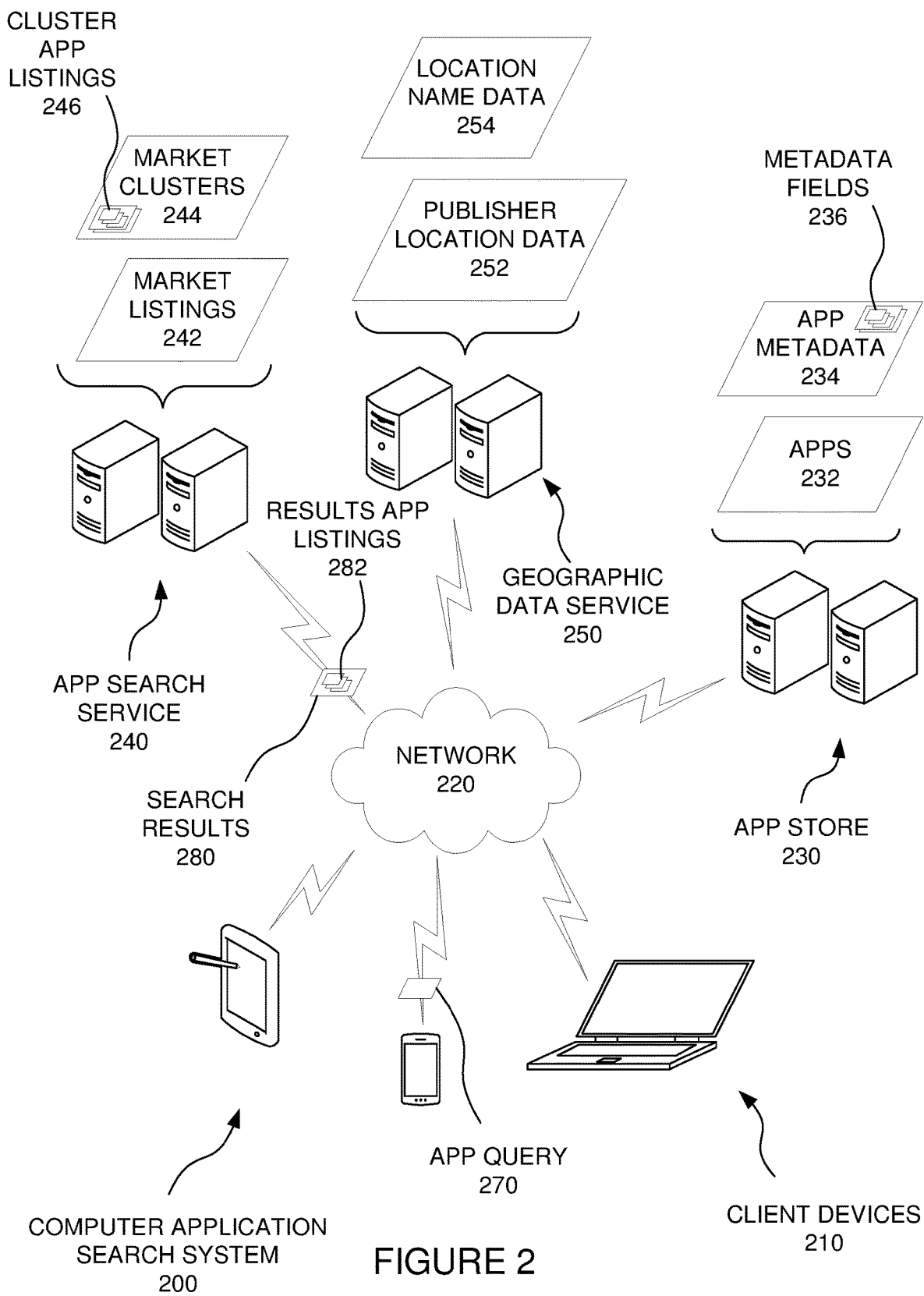
FIG. 2 is schematic diagram of a computer application search system.

FIG. 2 is a block diagram of a computer application search system (200) in conjunction with which one or more of the described aspects may be implemented.

Communications between the various devices and components discussed herein can be sent using computer system hardware, such as hardware within a single computing device, hardware in multiple computing devices, and/or computer network hardware. A communication or data item may be considered to be sent to a destination by a component if that component passes the communication or data item to the system in a manner that directs the system to route the item or communication to the destination, such as by including an appropriate identifier or address associated with the destination. Also, a data item may be sent in multiple ways, such as by directly sending the item or by sending a notification that includes an address or pointer for use by the receiver to access the data item. In addition, multiple requests may be sent by sending a single request that requests performance of multiple tasks.

A. Computer Application Search System Components

Referring now to FIG. 2, components of the computer application search system (200) will be discussed. Each of the components includes hardware, and may also include software. For example, a component of FIG. 2 can be implemented entirely in computer hardware, such as in a system on a chip configuration. Alternatively, a component can be implemented in computer hardware that is configured according to computer software and running the computer software. The components can be distributed across computing machines or grouped into a single computing machine in various different ways. For example, a single component may be distributed across multiple different computing machines (e.g., with some of the operations of the component being performed on one or more client computing devices and other operations of the component being performed on one or more machines of a server).

The computer application search system (200) can include one or more computer client devices (210). The client devices (210) can be configured to communicate with other computer devices over a computer network (220), such as a wired and/or wireless network, as discussed above. For example, a client device (210) can send data over the network (220) to an online computer application store (230), requesting computer applications (232) and/or application metadata (234) for such computer applications that are available from the application store (230). The computer devices of the application store (230) can respond by sending the requested applications (232) and/or application metadata (234) to the requesting client device (210) over the computer network (220). The application metadata (234) can include different metadata fields (236) for each available application (232) in the application store (230). For example, the metadata fields (236) may include an application title field, an application description field, a publisher name field, an application category field, and/or other metadata fields.

The client devices (210) can also communicate over the network (220) with a computer application search service (240). The search service (240) can maintain market listings (242), which can be sets of data that identify markets that have geographic components. For example, a market has a geographic component, and may also have some other component such as a language component. The geographic components of markets may differ. For example, a market may include multiple countries or a single country, a state or province within a country, a city, or a metropolitan area. As an example, one market may be an English language United States market. Another market may be an English language India market. Another market may be a Spanish language United States market. Another market may be a Paris, France metropolitan area market, without regard to language (of course, results may still be limited by language in some manner other than the use of market clusters (244) discussed herein).

The application search service (240) can also generate application market clusters (244), as discussed herein. Each such market cluster (244) includes data, which can include an indication of a market to which the market cluster (244) applies. Such indications may serve as the market listings (242) discussed above, or the market indications in the market clusters (244) may be separate from the market listings (242). Each cluster can also include one or more cluster application listings (246), each of which indicates an application (232) that is assigned to that market cluster (244). The market clusters (244) may be implemented in different continuous or discontinuous data structures. For example, each cluster (244) may include a title that indicates the corresponding market, and may also include a list structure (such as a series of entries in a database table, a markup language file, or some other data structure) that includes a cluster application listing (246) for each application assigned to the market cluster (244). Alternatively, a market cluster (244) may be more distributed, such as by including in multiple separately stored cluster application listings (246) that each include an indication of market cluster(s) (244) to which the corresponding application (232) is assigned.

The computer application search system (200) can also include other services with which the application search service (240) can communicate to retrieve data. For example, the application search service (240) can retrieve the application metadata (234) from the application store (230) over the network (220). The application search service may also communicate with a geographic data service (250), such as an online mapping service. The geographic data service (250) may provide the application search service (240) with geographic data that can be used in performing the application search service techniques discussed herein. For example, the geographic data service (250) may provide publisher location data (252), which can indicate a location for a publisher whose name is provided to the geographic data service (250) in a query, such as an application programming interface call. The geographic data service may also provide location name data (254), which can include the names of geographic locations and corresponding data regarding such locations. For example, the names of geographic locations may be the names of cities, states, countries, rivers, landmarks, mountains, and other types of geographic locations. As an example, the corresponding data may include an indication of the country in which each such geographic location is located.

The different components of the computer application search system (200) could be combined differently than illustrated in FIG. 2. For example, a single integrated search service could perform the functions of the application search service (240) and the geographic data service (250), rather than these services being separate as discussed herein. As another example, the application search service (240) may be separate from or integrated with the application store (230).

B. Computer Application Search System Operation

Referring still to FIG. 2, operation of the computer application search system (200) will be discussed. This operation can include the application search system (200) inferring markets for the applications (232), generating the market clusters (244), and using the generated market clusters (244) in responding to application queries (270) by providing search results (280), which include results application listings (282). The results application listings (282) can indicate applications (232) that the application search service (240) has determined to be responsive to the application query (270).

C. Directly Inferring Markets for Applications

The application search service (240) can infer the market that an application is relevant for, based on various metadata fields (236) in the application metadata (234), such as Name, Description, and Information metadata fields. The markets can be inferred for each of the applications (232) in the online application store (230).

The inferring of markets for the applications (232) can include the application search service (240) retrieving data to be used in the inferring, such as the application metadata (234), and the location name data (254). The application search service (240) may perform operations by invoking other services to perform operations using such data, which may be done without the application search service (240) retrieving the data. This inference and the generation of the market clusters (244) can be performed in an offline manner, rather than being performed at runtime in response to an application queries (270). Alternatively, all or part of these operations may be performed in response to application queries (270) at runtime. The inferring geographic components of markets for the applications (232) can include direct inference, and may also include indirect inference. Both are discussed below.

In addition, other components of the markets for the applications (232) may be extracted. For example, a language component can be extracted from a language metadata field (236) in the application metadata (234) for each application (232).

In direct inference, metadata is analyzed to infer geographic locations from that metadata. Following are some examples.

a) Extraction from Location References in Text

In this technique, the market identification can be extracted from the application metadata (234) using direct text extraction. Application metadata can include metadata fields (236), such as the App Name, App Description, and App Seller (or application publisher) information. The details below highlight examples of how the market identification can be inferred from each of these metadata fields (236) in the application metadata (234).

There are some applications (232) which have the market information in the name metadata field (236) for the application (232). For instance, an application name field may state XYZ App India, which includes the textual name of the country India in the name metadata field (236). This geographic area (India in this example) can be extracted using an approach which splits the application name into parts, and then each part can be checked by the application search service (240) to see if the part is a name for a geographic location. This can be done using geographic data, such as location name data (254), which can be a geographic location database that includes entries for geographic location names, as well as data indicating the geographic area for such names (the country in which a city is located, for example). If a geographic location reference is identified in the name, then the corresponding location can be correlated with a market. For example, if one of the markets in the market listings (242) is India, then this application can be assigned to the India market. As another example, if there is no India market specified in the market listings (242), but there is a market for a broader geographic area, such as southern Asia, then the corresponding location can be correlated with this southern Asia market using the location name data (254), and the application can be assigned to the southern Asia market.

In some instances, geographic location names may be ambiguous. For example, there may be multiple different cities with the same name, but which are in different countries. A reference in the application name metadata field (236) to such a city can be ambiguous. For example, if an application name states Ride Sharing App Vancouver, the reference "Vancouver" may be referring to Vancouver, Wash., United States, or it may be referring to Vancouver, British Columbia, Canada. For such ambiguous references, additional data in the application metadata (234) may be used to narrow down, or disambiguate, the reference. For example, the description metadata field (236) for the application may include a telephone number with a "360" area code, which is the area code for Vancouver, Wash. in the United States. This can be recognized by the application search service (240) using the location name data (254) (which can include data regarding telephone numbers and corresponding geographic areas), and the application can be assigned to a corresponding market in the market listings (242), such as a United States market.

Other metadata fields can also be parsed and analyzed by the application search service (240). For example, application description fields may include descriptions of which markets an application (232) is relevant for. The application search service can parse the description metadata fields (236), compare the portions of each metadata field (236) to the location name data (254) to recognize location names, and can use the location name data (254) to determine the markets in the market listings (242) apply. As an example, an application description metadata field (236) may include the following text: "App XYZ now serves Bangalore, Gurgaon, Hyderabad, Delhi, Kolkata, Mumbai, Pune, Chennai." If one of the markets in the market listings (242) is India, the application search service can recognize that all these cities are in the India market, and can assign the corresponding application to the India market.

The application search service (240) may utilize similar techniques to those discussed above for inference from the application name metadata fields (236), such as disambiguation. Similar techniques can also be applied to text in other metadata fields, such as application information metadata fields.

b) Extraction from Publisher Name Lookup

The application search service (240) can invoke a lookup of the application publisher or seller's name (which can be a name of an entity providing the application through the application store (230), whether payment is made for the application or not) to determine a geographic location for the publisher. For example, this can include the application search service (240) accessing the text in the application publisher metadata field (236) for an application. The application search service (240) can generate a query requesting a location for this text as the publisher, and can send the query to a geographic data service (250). The geographic data service (250) can execute the query to provide a geographic location for the publisher. For example, this can include finding an address for the publisher in a database of publisher location data (252). For example, the geographic data service (250) may be a general search engine that provides a mapping capability, and the search engine may also include a business directory listing, which may include a listing for the publisher. The geographic data service (250) can return the location data for the publisher to the application search service (240). This location data may include data such as a physical address and/or a telephone number. The application search service (240) can match this location data with a market in the market listings (242), similarly to the matching of the location references in the direct inference techniques discussed above.

In using this technique, it is possible an application may be useable in a broader range of markets that what is indicated by a location of the application's publisher. For example, a publisher may have multiple locations in different markets, or a publisher in one location may publish an application (232) that is designed for use in many different markets. This may be remedied to some extent by assigning each application (232) to all markets that can be inferred from the application metadata (234) for that application (232). Also, this application publisher lookup technique may only be used to assign an application to a market if the location lookup for the publisher yields a market location for the publisher that is outside a geographic area from whose perspective the location lookup is performed. For example, the query for the publisher location can indicate to the geographic data service (250) a location from whose perspective the lookup is to be performed (i.e., the lookup is performed assuming it is being done for a requesting user or requesting device located in that location). For example, a lookup may be done assuming the requester is in the United States, another lookup may be done assuming the requester is in India, another may be done assuming the requester is located in China, and another may be done assuming the requester is located in France. If only the United States lookup yields a United States address, then that result can be disregarded. On the other hand, if the United States lookup yields a seller location in China, then it may be inferred that China is a market in which the application (232) is relevant, or in which the application (232) is useable.

D. Generating Market Clusters

The inferred market assignments of the applications discussed above can be used by the application search service to generate market clusters (244). Each market cluster (244) can include data indicating the market to which the cluster applies. For example, a market cluster (244) may include the text "en-in" to indicate it is for an English language market in the country India. The generating of market clusters (244) can include inserting cluster application listings (246) in existing market clusters (244), or creating new market clusters (244) and inserting cluster application listings (246) in the new market clusters (244). In either scenario, the generating can include inserting cluster application listings (246) for applications (232) in response to the application search service (240) assigning those applications (232) to the markets for those market clusters (244). For example, it may be inferred using one of the techniques above that App XYZ is intended for the India market, which corresponds to an India market listing (242). In response, the application search service (240) can insert a cluster application listing (246) into an India market cluster (244) corresponding to that India market represented by the India market listing (242).

Use of the market clusters (244) in searching is discussed more below, after discussing supplementing the market clusters (244) using indirect inference of markets using proximity E. Indirect Inference Using Proximity If a market cannot be inferred for an application (232), then a clustering technique such as k-nearest neighbors (KNN) classification can be used to determine the proximity of the application (232) to the market clusters (244) that have already been defined. If the application (232) has a sufficient proximity to a market cluster (244), then the application (232) can be included as part of that market cluster (244) (by including a cluster application listing (246) for that application (232) in the market cluster (244)), and in doing so, it will be assigned the market of that market cluster (244).

In determining the proximity of an application (232) to an existing market cluster (244), relationships can be detected between the application metadata (234) of that application (232) and the application metadata (234) of the applications (232) that are already assigned to the market cluster (244). For example, consider App A to be an application (232) that is not yet assigned to a cluster (244) and App B to be an application that is already assigned to Cluster B, a market cluster (244). If the application search service (240) parses the application metadata (234) for App A and App B, and finds a statement in the application metadata (234) of either application (232) indicating that the publisher of App A is related to the publisher of App B, then this finding can indicate that App A is proximate to Cluster B. Similarly, if the application search service (240) finds a statement that App A is dependent on App B (where App A needs App B to be installed before App A will work properly), then this finding can indicate that App A is proximate to Cluster B. In finding such statements that indicate proximity, the application search service (240) can look for particular words or phrases. This may also include looking for alternative ways of saying the same or similar things to such words or phrases. In some implementations, the application search service (240) may submit at least a portion of the application metadata (234) to a natural language understand computer component, and may analyze the results from such a component to identify phrases that indicate a relationship between different applications (232) (such as relationships between the applications (232) themselves or between publishers of the applications (232)).

The application search service (240) may assign an application (232) to each market cluster (244) that includes an application for which the application search service (240) finds such a proximity indicator. Alternatively, the application search service (240) may only assign an application (232) to a market cluster (244) using this technique if a proximity threshold is met. For example, different weights may be assigned to different types of relationships. For each such relationship that is found between a subject application (232) an application in a cluster, the application search service can add the corresponding weight value to a running total representing the proximity between the application and the market cluster (244). The application search service (240) may also apply one or more other operations, such as normalizing operations to such proximity values, such as by decreasing or increasing a value to account for how many applications (232) are in the market cluster (244). If the proximity value exceeds a threshold value, then the application search service (240) can assign the application (232) to the market cluster (244) by inserting a cluster application listing (246) for the application in the market cluster (244).

As another example, the application search service (240) may use k-nearest neighbor classification by considering cluster memberships of a predetermined (k) number of applications (232) that have the greatest proximity to the subject application (232). The subject application (232) may be assigned to a market cluster (244) to which the greatest number of these k nearest neighbor applications are assigned. In making this determination, greater weight may be given to the cluster assignments of other applications (232) that are determined to have greater proximity to the subject application (232). For example, greater proximity may be exhibited by certain types of relationships and/or greater number of relationships between a subject application (232) and another application (232).

In the classification techniques discussed here for proximity, machine learning may be utilized to provide feedback to the classification technique. For example, weights for different types of relationships may be modified in response to feedback from user input response to actual search results, as part of such a machine learning technique. While these examples for determining proximity of applications (232) to market clusters (244) may be used, modifications of these determinations may be made. Other different classifying determinations for proximity between a subject application (232) and the applications (232) already assigned to a market cluster (244) may be used instead. Also, a subject application (232) may be assigned to multiple market clusters (244) using this indirect inference technique, or assignment may be limited to a single market cluster (244) for each application using this indirect inference technique.

F. Responding to Application Queries

In response to receiving an application query (270) from a client device (210) over the network (220), the application search service (240) can generate ranked search results using search engine techniques, such as ranking the applications (232) using a plurality of weighted factors, including factors representing popularity of the applications (232), relevance of the applications (232) to the application query (270), and average customer reviews of the applications (232). The search results (280) can include results application listings (282). Such results application listings (282) can each include a portion of the application metadata (234), and may include a selectable control, which can be selected to request the application metadata (234) from the application store (230) itself. This application metadata (234) from the application store can include another selectable control, which can be selected by user input to download and install the application (232) in a client device (210).

The application query (270) can include an indication of a geographic location for a requester (e.g., a location for the client device (210) and/or a location of an address for a user profile that is active on the client device (210)), and may include other data such as a language for the requester. The location may be included in a single communication with the remainder of the application query (270), or the location may be sent separately with an identifier that can be used to associate the location with the remainder of the application query (270).

In generating the search results (280), the application search service (240) can compare the location for the application query (270) with the geographic areas for the market clusters (244) to determine a market for the application query (270). This comparison may use the location name data (254), such as to determine a corresponding country for location data received in the application query (270).

After inferring a market for the application query (270) from the location data in the application query (270), the application search service (240) can access and analyze the cluster application listings (246) in the market cluster (244) for that inferred market to identify applications (232) that are assigned to the market for the application query (270). The application search service (240) can use these cluster application listings (246) to determine which applications (232) are assigned to the market for the application query (270), and which applications (232) are not assigned to the market for the application query (270). In some implementations, applications (232) may be determined to be non-assigned applications (232) (applications that are not assigned to the market for the application query (270)) only if those applications (232) are assigned to another market cluster (244) and are not assigned to the market for the application query (270). In other implementations, applications (232) that are not assigned to any other markets may also be determined to be non-assigned applications (232). In other words, in some implementations, the applications (232) that are not assigned to any market cluster (244) or are assigned to a general cluster can be considered to be assigned to each of the markets. In other implementations, the applications (232) that are not assigned to any market cluster (244) or are assigned to a general cluster can be considered to be assigned to none of the markets.

In generating the search results, the application search service (240) can favor inclusion of application listings for applications (232) that are assigned to the market for the application query (270) and/or disfavor or inhibit the inclusion of application listings for applications (232) that are not assigned to the market for the application query (270). For example, the application search service can determine whether the responsive applications for the application query (270) are assigned to the market inferred from the application query (270), and respond to such determinations by excluding from the search results application listings for applications (232) that are not assigned to the market for the application query (270), even though such listings would otherwise have been included in the search results listings (282). For example, once the corresponding market is extracted from the application query (270), the application search service (240) can use this inferred query market as a key to determine which market cluster (244) to go to, to retrieve the market specific applications (232) to be included in the results application listings (282). If there are no market specific applications (232) for the application query (270), then no such applications are returned, but generally applicable applications (232) that have not been found to be limited to specific market(s) may still be returned in the results application listings (282). The search results (280) may include market-specific results application listings (282) that are designated as market-specific in the search results (280), and may also include other results application listings (282) that are not designated as market specific. Such non-market specific results could include only results application listings (282) for applications (232) that have not been assigned to a specific market, or they may include such results as well as results application listings (282) that have only been assigned to other markets (markets besides the inferred market for the application query (270)).

As another example of favoring the inclusion of market specific applications (232) for the current application query (270) and inhibiting the inclusion of other applications (232), the application search service (240) may respond by decreasing the search results rankings for listings of applications (232) that are not assigned to the market for the application query (270), and/or by increasing the rankings of applications (232) that are assigned to the market for the application query (270) (applications that are determined to be generally applicable, such as applications that are not assigned to any markets, may also have their rankings boosted, or there may be no market effect on the rankings of such applications). For example, such increased and/or decreased rankings may be produced by including weighted factors representing the market assignment status of applications (232) in a search ranking technique that includes an operation using multiple weighted factors to produce a final weighted score for each application (232) being ranked.

For applications (232) for which no market is inferred by the application search service (240), the application search service (240) may not include cluster application listings (246) for such applications (232) in a market cluster (244). Alternatively, the application search service (240) may include cluster application listings (246) for such applications (232) in a general market cluster (244). In either scenario, the application search service (240) may include search results application listings (282) for such applications (232) in search results (280) in response to application queries (270) that are identified with any of the markets, so long as such applications (232) are otherwise determined to be responsive to such application queries (270). The application search service (240) may apply greater favor to including results application listings (282) for applications (232) assigned to the identified market for an application query (270) than for generally-applicable applications (232) that are not assigned to any market (e.g., by applying a greater weighted factor for applications (232) assigned to the identified market than for generally applicable applications (232) not assigned to any market, as part of generating ranking scores using multiple weighted factors). Also, where an application (232) is assigned to multiple market clusters (244), the application search service (240) may favor inclusion of search results application listings (282) for such applications (232) in search results (280) in response to application queries (270) that are identified with any of those multiple markets for the assigned market clusters (244) (in the same manner as for applications (232) only assigned to a single market), so long as such applications (232) are otherwise determined to be responsive to such application queries (270).

III. Market Cluster Computer Application Searching Techniques

A market cluster computer application searching technique will now be discussed. The technique, including variations thereof discussed herein, can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable memory may have computer-executable instructions embodied thereon that, when executed by at least one processor, cause at least one processor to perform the technique. The techniques discussed below may be performed at least in part by hardware logic.

Figure 3:
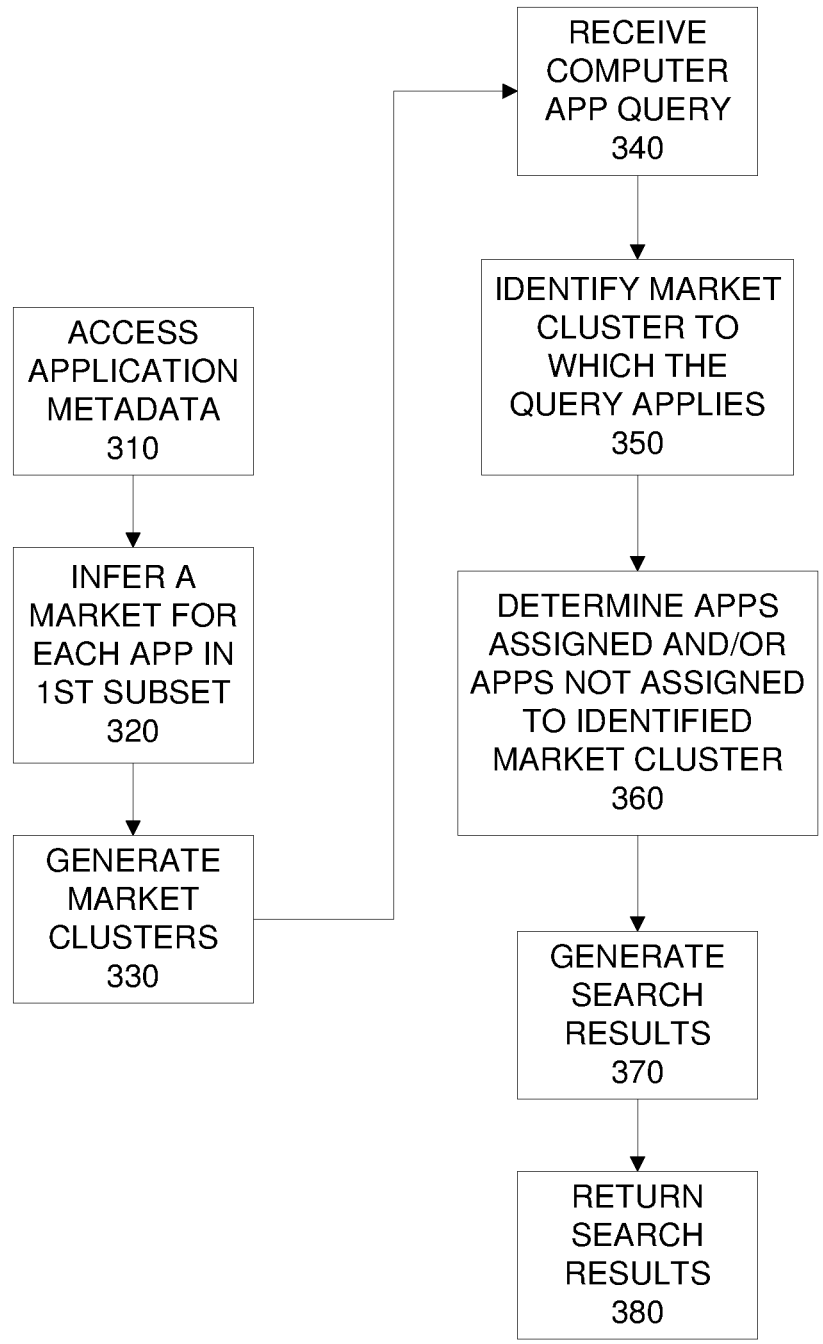
FIG. 3 is a flowchart of a market cluster computer application searching technique.

Referring to FIG. 3, a market cluster computer application searching technique will be described. The technique can include accessing (310) application metadata from an online computerized store for a set of computer applications available from the online store. A market of multiple available markets can be inferred (320) for each application in a first subset of applications. Such inferring may be done for all applications in the set of applications, including the first subset as well as other applications in the set of applications. This inferring (320) can include inferring each market from text in one or more metadata fields in the application metadata. The metadata fields can include fields that are not specific to the one or more markets (i.e., fields that are not designed specifically for indicating markets for the corresponding applications). Each of the markets can be defined at least in part by a corresponding geographic area (for example, a market for a specified country, or a market for a specified language in a specified country). The technique of FIG. 3 can further include generating (330) computer-readable market clusters, with each of the market clusters indicating a corresponding one of the markets, and with the clusters indicating an inferred market cluster of the computer-readable market clusters for each of the applications in the first subset.

The technique can also include receiving (340) a computer application query, and responding to this receiving (340) by performing responsive acts. As an example, the received query may be an application category query, with the application query defining a category of computer applications for which a search is requested. The responsive acts can include identifying (350) a market cluster of the computer-readable market clusters to which the query applies, as well as determining (360) that one or more assigned applications are assigned to the identified market cluster and/or that one or more unassigned applications are not assigned to the identified market cluster. The responsive acts can further include generating (370) digital computer search results. The generating (370) of the search results can include favoring inclusion of the one or more assigned applications in the computer search results and/or inhibiting inclusion of the one or more non-assigned applications in the computer search results in response to the determining (360). The responsive acts can also include returning (380) the computer search results in response to the application query. This technique of FIG. 3 can be used with one or more of the features discussed in the following paragraphs, in any combination.

The inferring (320) of a market can include identifying a reference to a name of a publisher of a corresponding application in metadata for the corresponding application. It can also include identifying a geographic area corresponding to the referenced name of the publisher, and determining that the identified area is in a geographic area of the market. The identifying of the geographic area can include generating a name location query, with the name location query requesting a location for an entity with the name of the publisher; retrieving results of the location query from a computer search engine; and processing the results of the location query. The processing of the results can include identifying a reference to the identified geographic area in the results of the location query (such as an address in the geographic area, or a telephone number from the geographic area).

The inferring of a market from the text in the one or more metadata fields can include identifying a reference to a geographic area in the text in the one or more metadata fields; and determining that the referenced geographic area is in a geographic area of the market.

The technique of FIG. 3 may further include assigning each application in a second subset of applications in the set of applications in the set of applications to one of the market clusters, with this assigning including determining proximity of each application in the second subset to one of the market clusters using the application metadata. The determining of proximity may include identifying a relationship between a publisher of a first application in the first subset and a publisher of a second application in the second subset. In this scenario, the determining of proximity may further include determining that the first application is assigned to a first cluster of the market clusters, with the assigning of each application in the second subset including assigning the second application to the first cluster. The determining of proximity may include identifying a dependency between a first application in the first subset and a second application in the second subset (such as where one of these applications only works properly or has full functionality if the other one is installed on the same device). The determining of proximity can further include determining that the first application is assigned to a first cluster of the market clusters, and the assigning of each application in the second subset can include assigning the second application to the first cluster.

The corresponding geographic areas for the markets may be countries; groups of countries; geographic regions, provinces, or states within countries; metropolitan areas; cities; or other geographic areas.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer system comprising:
   at least one processor; and
   memory comprising instructions stored thereon that when executed by at least one processor cause at least one processor to perform acts comprising:

accessing application metadata from an online computerized store for a set of computer applications available from the online computerized store;

inferring a market of multiple available markets for each application in a first subset of the applications, with the inferring comprising inferring each market from text in one or more metadata fields in the application metadata, with the metadata fields comprising fields that are not specific to the markets, with each of the markets being defined at least in part by a corresponding geographic area;

generating computer-readable market clusters, with each of the market clusters indicating a corresponding one of the markets, and with the clusters indicating an inferred market cluster of the computer-readable market clusters for each of the applications in the first subset;

receiving a computer application query; and in response to the receiving of the application query, performing the following:

identifying a market cluster to which the query applies, with the market cluster to which the query applies being one of the computer-readable market clusters;

generating computer search results, with the generating of the computer search results comprising favoring inclusion of one or more listings for one or more applications assigned to the identified market cluster relative to one or more listings for one or more applications not assigned to the identified market cluster in response to the identifying of the market cluster to which the query applies; and returning the computer search results in response to the application query.

2. The computer system of claim 1, wherein the inferring of a market from the text in the one or more metadata fields comprises:

identifying a reference to a name of a publisher of a corresponding application in metadata for the corresponding application;

identifying a geographic area corresponding to the referenced name of the publisher; and determining that the identified area is in a geographic area of the market.

3. The computer system of claim 2, wherein the identifying of the geographic area comprises:

generating a name location query, with the name location query requesting a location for an entity with the name of the publisher;

retrieving results of the location query from a computer search engine; and processing the results of the location query, with the processing of the results comprising identifying a reference to the identified geographic area in the results of the location query.

4. The computer system of claim 1, wherein the inferring of a market from the text in the one or more metadata fields comprises:

identifying a reference to a geographic area in the text in the one or more metadata fields; and determining that the referenced geographic area is in a geographic area of the market.

5. The computer system of claim 1, wherein the acts further comprise assigning each application in a second subset of applications in the set of applications to one of the market clusters, with the assigning of each application in the second subset comprising determining proximity of each application in the second subset to one of the market clusters using the application metadata.

6. The computer system of claim 5, wherein the determining of proximity comprises identifying a relationship between a publisher of a first application in the first subset and a publisher of a second application in the second subset, wherein the determining of proximity further comprises determining that the first application is assigned to a first cluster of the market clusters, and wherein the assigning of each application in the second subset comprises assigning the second application to the first cluster.

7. The computer system of claim 5, wherein the determining of proximity comprises identifying a dependency between a first application in the first subset and a second application in the second subset, wherein the determining of proximity further comprises determining that the first application is assigned to a first cluster of the market clusters, and wherein the assigning of each application in the second subset comprises assigning the second application to the first cluster.

8. The computer system of claim 1, wherein the corresponding geographic area for at least one of the markets is a country.

9. A computer-implemented method, comprising:

accessing application metadata from an online computerized store for a set of computer applications available from the online computerized store;

inferring a market of multiple available markets for each application in a first subset of the applications, with the inferring comprising inferring each market from text in one or more metadata fields in the application metadata, with the metadata fields comprising fields that are not specific to the markets, and with the inferring of a market from the text in the one or more metadata fields comprising identifying a reference to a geographic area in the text in the one or more metadata fields and determining that the referenced geographic area is in a geographic area of the market;

generating one or more computer-readable market clusters, with each of the market clusters indicating a corresponding one of the markets, and with the clusters indicating an inferred market cluster of the computer-readable market clusters for each of the applications in the first subset;

receiving an application category query, with the application query defining a category of computer applications for which a search is requested; and in response to the receiving of the application query, performing the following:

identifying a market cluster to which the query applies, with the market cluster to which the query applies being one of the computer-readable market clusters;

determining that one or more non-assigned applications are not assigned to the identified market cluster;

generating computer search results, with the generating of the computer search results comprising favoring inclusion of one or more listings for one or more applications assigned to the identified market cluster relative to one or more listings for one or more applications not assigned to the identified market cluster in response to the identifying of the market cluster to which the query applies; and returning the computer search results in response to the application query.

10. The method of claim 9, wherein the inferring of a market from the text in the one or more metadata fields comprises:
   identifying a reference to a name of a publisher of a corresponding application in metadata for the corresponding application;
   identifying a geographic area corresponding to the referenced name of the publisher; and
   determining that the identified area is in a geographic area of the market.

11. The method of claim 10, wherein the identifying of the geographic area comprises:
   generating a name location query, with the name location query requesting a location for an entity with the name of the publisher;
   retrieving results of the location query from a computer search engine; and
   processing the results of the location query, with the processing of the results comprising identifying a reference to the identified geographic area in the results of the location query.

12. The method of claim 9, wherein the method further comprises assigning each application in a second subset of applications in the set of applications to one of the market clusters, with the assigning of each application in the second subset comprising determining proximity of each application in the second subset to one of the market clusters using the application metadata.

13. The method of claim 12, wherein the determining of proximity comprises identifying a relationship between a publisher of a first application in the first subset and a publisher of a second application in the second subset, wherein the determining of proximity further comprises determining that the first application is assigned to a first cluster of the market clusters, and wherein the assigning of each application in the second subset comprises assigning the second application to the first cluster.

14. The method of claim 12, wherein the determining of proximity comprises identifying a dependency between a first application in the first subset and a second application in the second subset, wherein the determining of proximity further comprises determining that the first application is assigned to a first cluster of the market clusters, and wherein the assigning of each application in the second subset comprises assigning the second application to the first cluster.

15. One or more computer-readable storage media having computer-executable instructions embodied thereon that, when executed by at least one processor, cause at least one processor to perform acts comprising:
   accessing application metadata from an online computerized store for a set of computer applications available from the online computerized store;
   inferring a market of multiple available markets for each application in a first subset of the applications, with the inferring comprising inferring each market from text in one or more metadata fields in the application metadata, with the metadata fields comprising fields that are not specific to the markets, with the inferring of a market from the text in the one or more metadata fields comprising the following:
      identifying a reference to a name of a publisher of a corresponding application in metadata for the corresponding application;
      identifying a geographic area corresponding to the referenced name of the publisher; and
      determining that the identified area is in a geographic area of the market;
   generating one or more computer-readable market clusters, with each of the market clusters indicating a corresponding one of the markets, and with the clusters indicating an inferred market cluster of the computer-readable market clusters for each of the applications in the first subset;
   receiving a computer application query; and
   in response to the receiving of the application query, performing the following:
      identifying a market cluster to which the query applies, with the market cluster to which the query applies being one of the computer-readable market clusters;
      determining that one or more assigned applications are assigned to the identified market cluster;
      determining that one or more non-assigned applications are not assigned to the identified market cluster;
      generating computer search results, with the generating of the computer search results comprising favoring inclusion of one or more listings for the one or more assigned applications relative to one or more listings for the one or more non-assigned applications in response to the identifying of the market cluster to which the query applies; and
      returning the computer search results in response to the application query.

16. The one or more computer-readable storage media of claim 15, wherein the identifying of the geographic area comprises:
   generating a name location query, with the name location query requesting a location for an entity with the name of the publisher;
   retrieving results of the location query from a computer search engine; and
   processing the results of the location query, with the processing of the results comprising identifying a reference to the identified geographic area in the results of the location query.

17. The one or more computer-readable storage media of claim 15, wherein the inferring of a market from the text in the one or more metadata fields comprises:
   identifying a reference to a geographic area in the text in the one or more metadata fields; and
   determining that the referenced geographic area is in a geographic area of the market.

18. The one or more computer-readable storage media of claim 15, wherein the acts further comprise assigning each application in a second subset of applications in the set of applications to one of the market clusters, with the assigning of each application in the second subset comprising determining proximity of each application in the second subset to one of the market clusters using the application metadata.

19. The one or more computer-readable storage media of claim 18, wherein the determining of proximity comprises identifying a relationship between a publisher of a first application in the first subset and a publisher of a second application in the second subset, wherein the determining of proximity further comprises determining that the first application is assigned to a first cluster of the market clusters, and wherein the assigning of each application in the second subset comprises assigning the second application to the first cluster.

20. The one or more computer-readable storage media of claim 19, wherein the determining of proximity comprises identifying a dependency between a first application in the first subset and a second application in the second subset, wherein the determining of proximity further comprises determining that the first application is assigned to a first cluster of the market clusters, and wherein the assigning of each application in the second subset comprises assigning the second application to the first cluster.

* * * * *